US009858355B1

(12) United States Patent
Bordash et al.

(10) Patent No.: US 9,858,355 B1
(45) Date of Patent: Jan. 2, 2018

(54) SEARCH ENGINE OPTIMIZATION BASED UPON MOST POPULAR SEARCH HISTORY

(71) Applicant: INTERNATIONAL BUSINESS MACHINES CORPORATION, Armonk, NY (US)

(72) Inventors: Michael J. Bordash, Newtown, CT (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/337,565

(22) Filed: Oct. 28, 2016

(51) Int. Cl.
 *G06F 17/30* (2006.01)

(52) U.S. Cl.
 CPC .. *G06F 17/30902* (2013.01); *G06F 17/30867* (2013.01); *G06F 17/30896* (2013.01)

(58) Field of Classification Search
 CPC ......... G06F 17/30902; G06F 17/30867; G06F 17/30896; G06F 17/30864; G06F 17/3089; G06F 17/30424; G06F 11/3065; G06F 17/28; G06F 17/30395; G06F 17/3048; G06F 17/30312; G06F 17/30345; G06F 17/30646
 USPC ........................................................ 707/709
 See application file for complete search history.

(56) References Cited

U.S. PATENT DOCUMENTS

| 8,131,703 | B2 | 3/2012 | Bessieres et al. | |
|---|---|---|---|---|
| 8,452,772 | B1 | 5/2013 | Carpio et al. | |
| 9,183,297 | B1 * | 11/2015 | Baker | G06F 17/30864 |
| 2010/0318508 | A1 * | 12/2010 | Brawer | G06F 17/30864 |
| | | | | 707/709 |
| 2012/0191691 | A1 | 7/2012 | Hansen | |
| 2013/0080611 | A1 * | 3/2013 | Li | H04N 21/222 |
| | | | | 709/223 |
| 2014/0149533 | A1 * | 5/2014 | Bergman | H04L 67/1097 |
| | | | | 709/213 |

OTHER PUBLICATIONS

Anonymous; System and method to improve search result ranking through real-time analysis of user's session behavior; IP.com Prior Art Database Technical Disclosure; IPCOM000198183D; Jul. 29, 2010; 14 pages.

Anonymous; Method to improve ranking of search results in technical documentation; IP.com Prior Art Database Technical Disclosure; IPCOM000194438D; Mar. 24, 2010; 4 pages.

(Continued)

*Primary Examiner* — Evan Aspinwall
(74) *Attorney, Agent, or Firm* — Schmeiser, Olsen & Watts; Isaac J. Gooshaw (57) ABSTRACT

The present invention provides a method and system for search engine optimization based upon most popular search histories. The method includes a server receiving a search query from a user for a website, and corresponding search result data from the website. A determination is made whether a number of times the search query has been received by the website in a given time period exceeds a given popularity threshold value. The server stores the search query and corresponding search result data to a static html page when the popularity threshold is exceeded, then generates and stores a site map corresponding to the website to include the static html page.

20 Claims, 6 Drawing Sheets

(56) References Cited

OTHER PUBLICATIONS

IBM; Highlighting Search Term History in Search Results; IP.com Prior Art Database Technical Disclosure; IPCOM000187009D; Sep. 1, 2009; 7 pages.
Kurian, Archana et al.; Analyzing and Classifying User Search Histories for Web Search Engine Optimization; 2014 3rd International Conference on Eco-friendly Computing and Communication Systems (ICECCS); Dec. 18-21, 2014; pp. 39-44.

* cited by examiner

SEARCH ENGINE OPTIMIZATION BASED UPON MOST POPULAR SEARCH HISTORY

TECHNICAL FIELD

The invention relates generally to searching the Internet and more specifically to focusing search results of a search query presented to various search engines by updating site maps corresponding to pages searched on a website.

BACKGROUND

Site maps of Internet websites enable a Webmaster to inform search engines about URLs on a website (aka "site") that are available for crawling. A URL (uniform resource locator) is an address of a World Wide Web page, typically being an XML file (extensible markup language open standard that defines a set of rules for encoding documents in a format which is both human-readable and machine-readable). The site map also includes additional information about each URL such as: date of the last update, frequency of change and importance of the URL's relationship to other URLs on the site. Site maps enable public search engines to crawl a site more intelligently.

The site typically has it's own embedded search capabilities, which can be very powerful. However, these searches and results are typically not archived in a form useful to existing public search engines. Thus, it would be advantageous for popular intra-site searches and results to be captured and made available to web crawlers and public search engines external to the site.

SUMMARY

The present invention provides a method, and associated computer system and computer program product, for search engine optimization based upon most popular search histories. The method includes receiving, by a server, from one or more users via computing devices, a search query to be searched at a first website; receiving, by the server, search result data from the first website in response to the search query, said search result data including a number of times the search query has been received by the first website in a predetermined time period; determining whether the number of times the search query has been received by the first website in the predetermined time period exceeds a predetermined popularity threshold value; storing, by the server, the search query and the search result data to a static html page when the number of times the search query has been received by the first website exceeds the predetermined popularity threshold value; and generating and storing, by the server, a site map corresponding to the first website to include the static html page.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
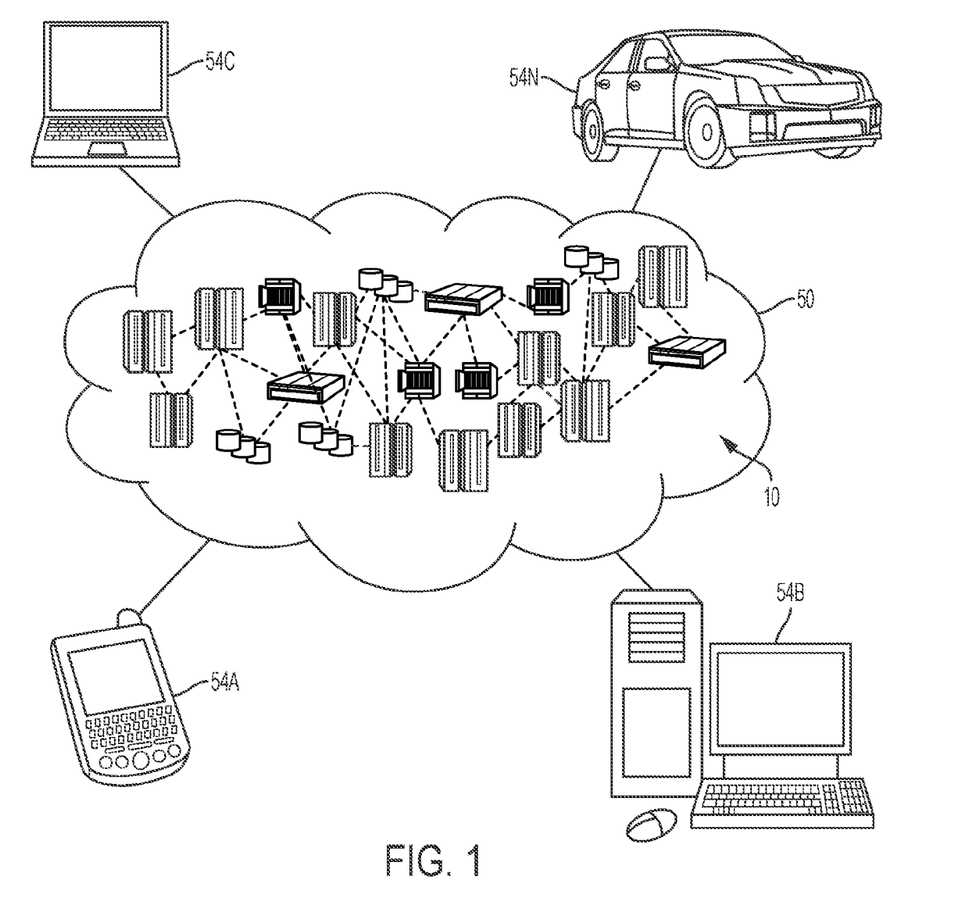
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
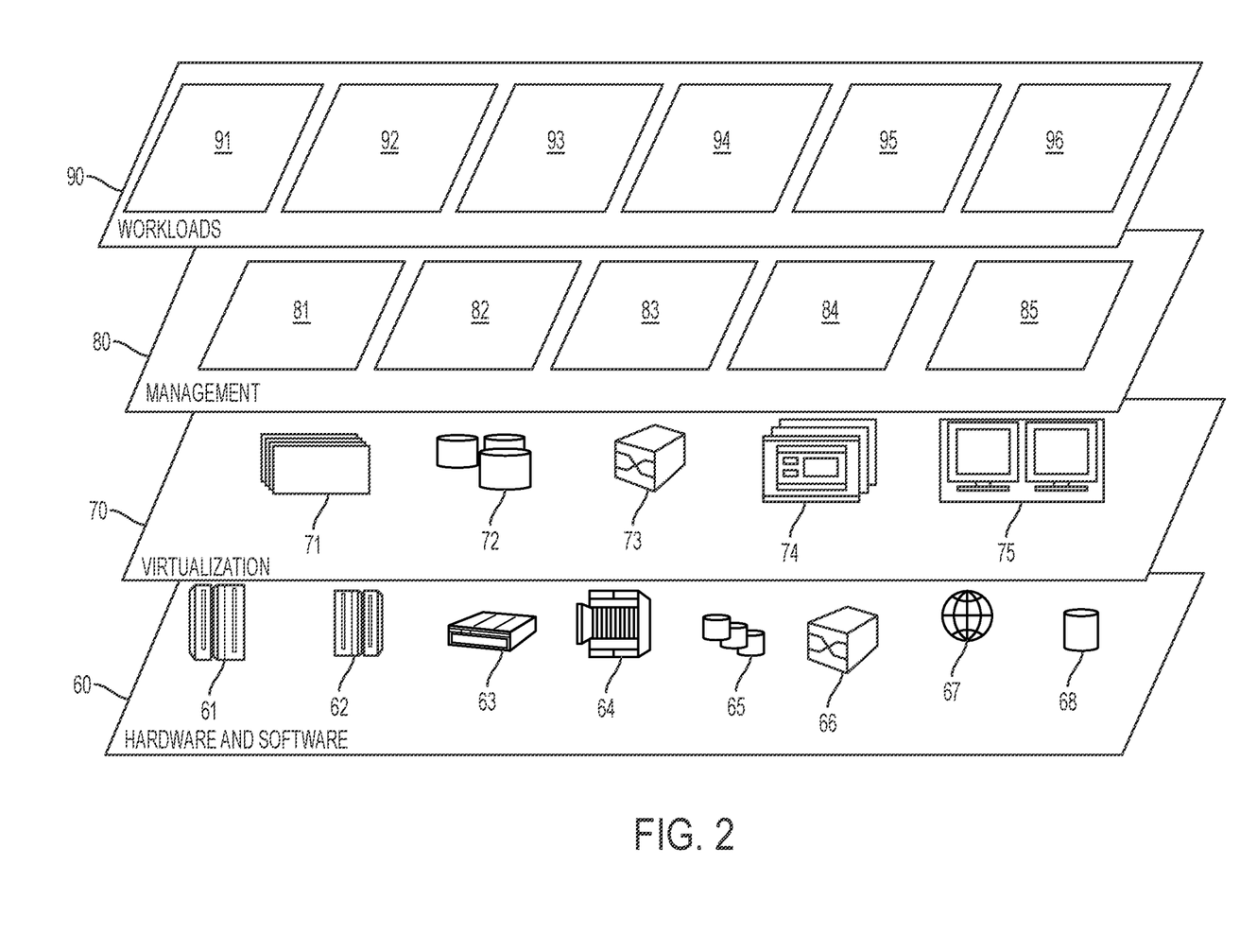
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide prearrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Internet search methods 96.

Figure 3:
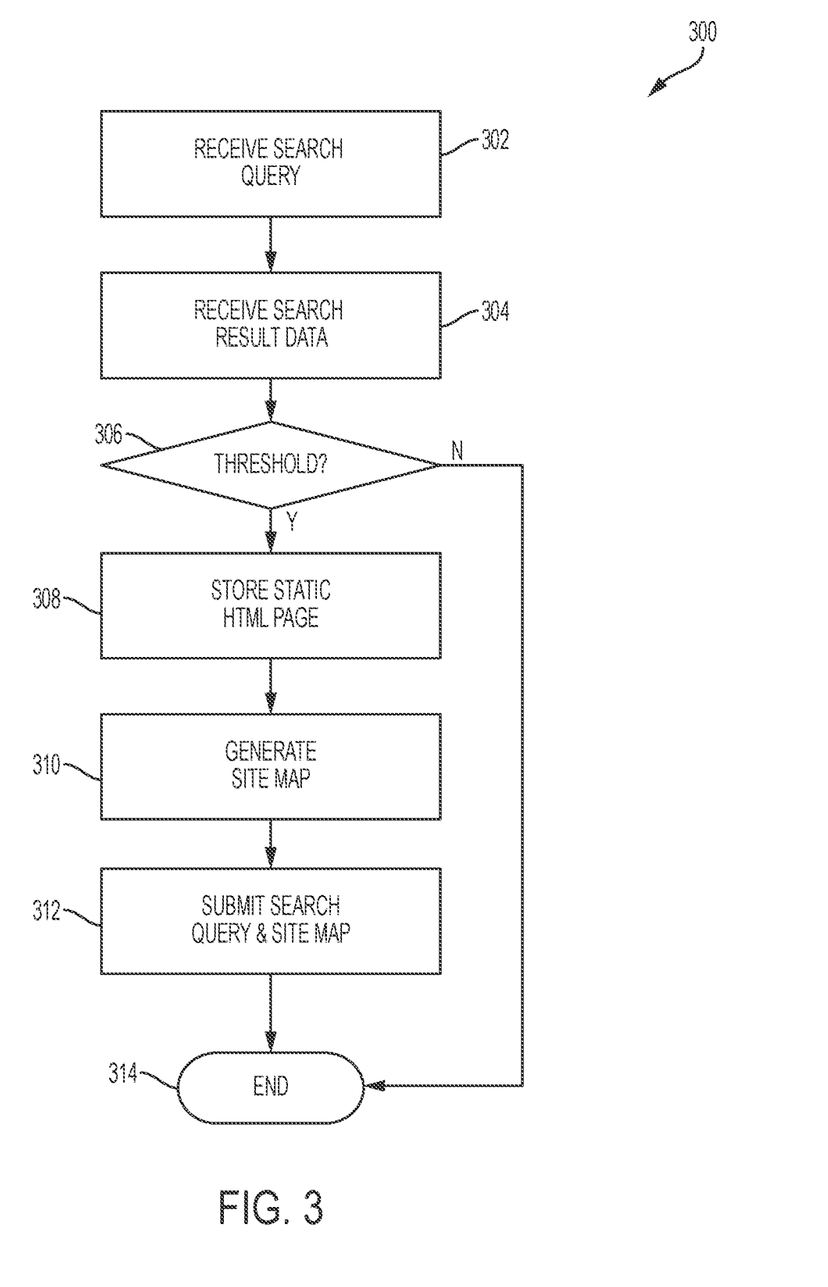
FIG. 3 is a flowchart diagram of a search method according to an embodiment of the present invention.

FIG. 3 is a flowchart diagram of a search method 300 according to an embodiment of the present invention.

In step 302 a server receives a search query to be searched at a first time at a first website from a user of a computing device. The search query can include one or more key words or phrases. In certain cases, numerous key words or phrases can have identical meanings.

The server, which offers Internet service to the user, would typically be associated with whatever Internet service provider is used by the user. The user's computing device could be any type of computing device which communicates with the Internet, such as a desktop computer, a laptop computer, a smart phone or tablet, etc. In the current example, the initial search query is "computer printers" which will be searched on the Google® public search engine, i.e. the server. Other search engines such as, but not limited to, Yahoo® or Bing® search engines could also be used.

Sitemaps protocol allows a webmaster to inform search engines about URLs on a website that are available for crawling. A Sitemap is an XML file that lists the URLs for a site. It allows webmasters to include additional information about each URL: when it was last updated, how often it changes, and how important it is in relation to other URLs in the site. This allows search engines to crawl the site more intelligently. Sitemaps are a URL inclusion protocol and complement robots.txt, a URL exclusion protocol.

Sitemaps are particularly beneficial on websites where:

some areas of the website are not available through the browsable interface;

webmasters use rich Ajax, Silverlight, or Flash content that is not normally processed by search engines;

the site is very large and there is a chance for the web crawlers to overlook some of the new or recently updated content;

when websites have a huge amount of pages that are isolated or not well linked together; or when a website has few external links.

In the current example, the search query "computer printers" is submitted by a user's computing device to a Google search whereby the Google search engine receives the search query from the user and sends the query to various websites across the Internet. In step 304 the server receives search result data from a first website in response to the search query. In this case the website is associated with an online Computer Supplies Store. The search result data includes the search query and a number of times the search query has been received by the first website within a predetermined time period, e.g. 30 days. The number of times that a particular search query is received by the first website is information that is available e.g. via an embedded search engine within the first website.

The first website in this example is associated with a company called the Computer Supplies Store which is a proprietary website used for marketing and selling goods online which are available at the store. For example the Computer Supplies Store could be a company such as Staples® which is an office supply store with a website at www.Staples.com which sells goods including computers, computer printers, office furniture, etc. Staples® is a registered trademark at the United States Patent and Trademark Office. In the current example the Staples website could be the first website to where the search query is sent. When the search query is sent to the Staples website, an embedded search engine within the website will find matches of specific URLs for "computer printers" on its website.

The predetermined time period could be a default period, such as 30 days, or it could be selected by the server or the user via a software program resident on the server or on the user's computing device, and the time period could be sent to the first website along with the search query.

In step 306 the server analyzes the search result data received back from the first website to determine whether the number of times the "computer printers" search query was received by the first website during the predetermined time period exceeded a predetermined popularity threshold value. The predetermined popularity threshold value is defined as a number of times that a specific search query has been received by the first website within the predetermined time period. The popular threshold value can be set manually by the user, or automatically by the software a program resident on the server or the user's computing device. Alternatively, the threshold value could be a predetermined default value such as 100,000.

If the number of times the "computer printers" search query has been received by the first website does not exceed the predetermined popularity threshold value, e.g. 100,000, then the process ends in step 314. However, if the number of times the "computer printers" search query has been received by the first website does exceed the predetermined popularity threshold value, then the process continues in step 308 where the server stores the search query and the received search result data to a static html page. In step 310 a site map corresponding to the first website is generated and stored within a memory of the server or the user's computing device to include the static html page. Any time a synonymous search query is received by the server from the user, the site map for the first website will be available for searching on a public search engine to provide quick and precise URL locations of the most popular URLs that are available on the proprietary first website with regards to the search query. The use of the site map will obviate excessive deep searching into the first website by public search engines. The search method 300 of FIG. 3 ends in step 314.

Figure 4:
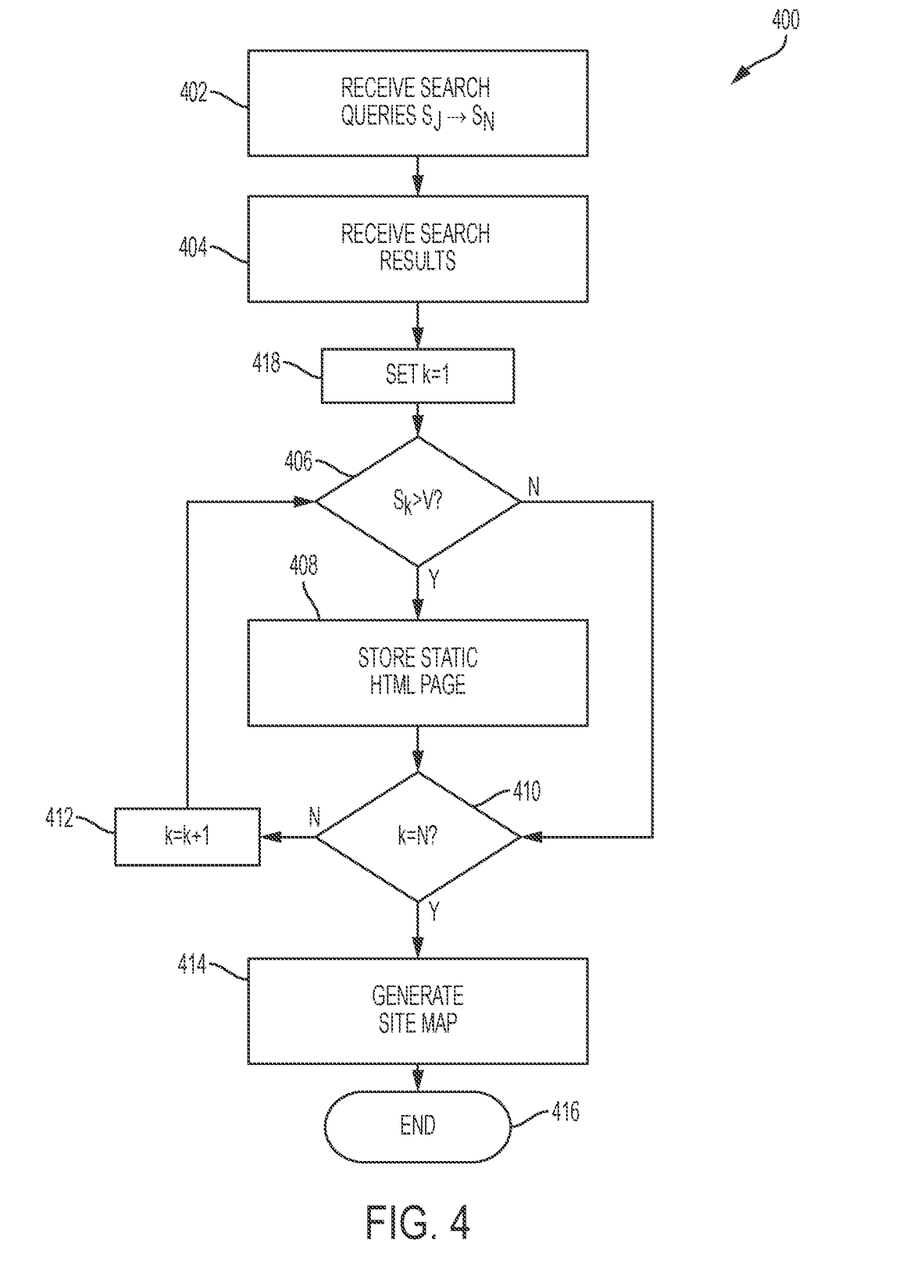
FIG. 4 is a flowchart diagram of a search method according to another embodiment of the present invention.

FIG. 4 is a flowchart diagram of a search method 400 according to another embodiment of the present invention.

In step 402 a plurality of search queries are presented to a server over a predetermined time period, e.g. 2.0 minutes, to be searched at the first website. The search queries originate from one or more users of computing devices such as desktop computers, laptop computers, smart phones, etc. Each of the search queries can include a request for additional data from the first website such as a number of times each search query has been received by the first website within a predetermined time period such as during a 30 day period prior to receipt of the search query.

Figure 5:
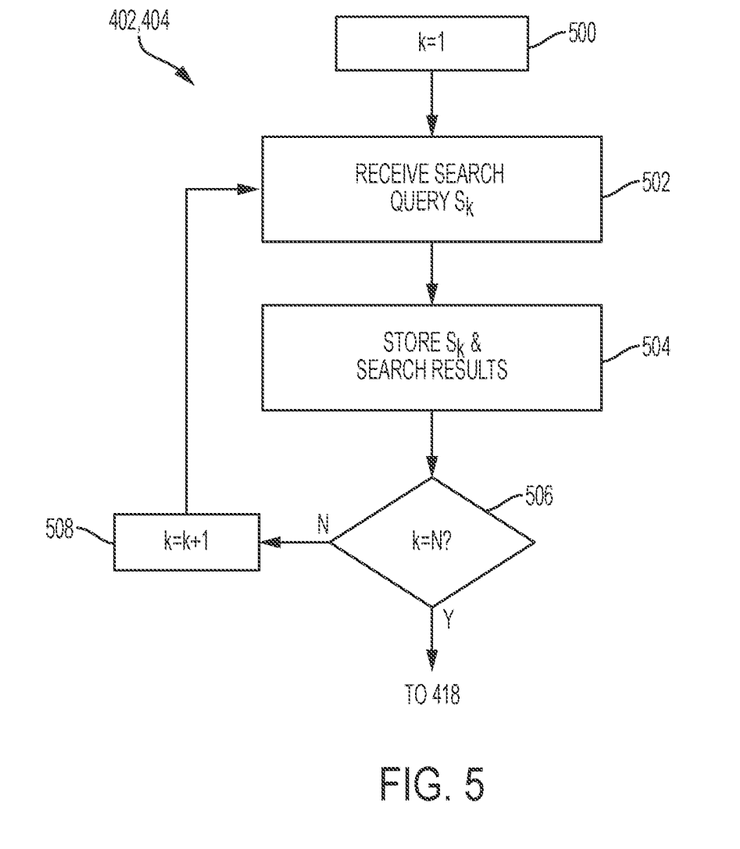
FIG. 5 is a flowchart diagram for receiving a plurality of search queries and corresponding search results as in step 402 of the search method of FIG. 4 according to an embodiment of the present invention.

FIG. 5 is a flowchart diagram for receiving a plurality of search queries and corresponding search results as in step 402 of the search method of FIG. 4 according to an embodiment of the present invention. The different searches are identified by the expression $S_K \rightarrow S_N$ where $S_K$ is the search query for item number K, and $S_N$ is the search query for the last item number N of the group $K \rightarrow N$. N equals the number of different search queries within the predetermined time period and K is initialized to K=1. In the current example, a user will submit 5 search queries where N=5 to find information about computer printers. The first search query as in the previous example is "computer printers", the second search query is "all-in-one printers", the third search query is "HP printers", the fourth search query is "Hewlett-Packard computer printers" and the fifth search query is "Apple compatible printers". Apple®, HP® and Hewlett-Packard® are registered trademarks at the United States Patent and Trademark Office.

In step 500 K is initialized whereby K=1. In step 502 the server receives a search query from the user's computing device. In step 504 the server receives search result data corresponding to the search query $S_K$. The search query $S_K$ and the corresponding search result data is stored by the server into the server or the user's computing device. Decision step 506 determines whether K=N. In other words, step 506 determines whether there are more queries in the plurality of queries being submitted by the user and received by the server. In this example K=1 and N=5 so the answer to decision step 506 is "no" and K is incremented by 1 whereby K=K+1. The process of FIG. 5 continues until finally K=5 and the process moves on to step 418.

A time period could be established in order to limit the number of search queries submitted by a user or users as described above for step 502. For example, if a 2 minute time period can be selected by the software program on the user's computing device or on the server. In this case decision block 506 would determine whether the 2 minute period has expired. If not, then the process will increment K in step 508 and continue to loop. If the time period expires, then decision step 506 would move the process to step 418. As another example, both a time period and a number of search queries are limiting factors, e.g. there is a limit of 5 search queries to be entered within a 2 minute period. Whichever limit is reached first will send the process to step 418. If the 5 search queries are received by the server within the first 90 seconds, then the process will move to step 418. However, if only 4 search queries are received during the 2 minute period, then the process will also be sent to step 418.

In another embodiment the decision step 506 can continue to loop back to step 502 as long as additional search queries are presented and received by the server without consideration of a constraining time period.

Turning back to FIG. 4, the server receives a plurality of search queries in step 402 and receives search result data from the first website in step 404 in response to each of the plurality of search queries. In step 418 K is reset to K=1. The search result data can include a number of times each search query has been received by the first website in a predetermined time period T such as within the past 30 days, e.g. T=30. In the current example the following search results numbers are received and listed in TABLE I below for $S_K \rightarrow S_N$ where K=1, N=5.

TABLE I

| Search Query | K | Number of Searches during T = 30 |
|---|---|---|
| computer printers | 1 | 112,000 |
| all-in-one printers | 2 | 82,000 |
| HP printers | 3 | 64,000 |
| Hewlett-Packard printers | 4 | 18,500 |
| Apple compatible printers | 5 | 9,600 |

Step 418 sets K=1, then in step 406 the search results $S_K$ are compared with the predetermined popularity threshold value V which in this example is V=100,000. V is defined as the predetermined popularity threshold value. Since the 112,000 searches for K=1 exceeds V, the method moves to step 408 where the search query and search result data corresponding to K=1 is stored by the server to the static html page on the server. In step 410 a determination is made whether K=N. In this case K does not equal N so the process continues in step 412 where K is incremented so that K=K+1 and the process loops back to step 406. In step 406 S2 is 82,000 which is not greater than V so the process continues again to step 410 where K and N are compared. Since K=2 and N=5, the process continues to step 412 where K is incremented to be K=3. This loop continues until K=5 and K=N in step 410. At that point the process moves on to step 414 where the server generates and stores a site map corresponding to the first website and including the static html page. The process 400 ends in step 416.

In yet another embodiment using the same 5 search queries, the parameters are established as $S_K \rightarrow S_N$ where K=1, N=5 and the predetermined popularity threshold V=60,000. The same process of FIG. 4 as described above is followed only this time there are three search queries that meet the predetermined popularity threshold value of V=60,000. The search queries of "computer printers", "all-in-one printers" and "HP printers" each correspond to search result data greater than V=60,000.

In step 406 when K=1 it is determined that $S_1$=112,000 or $S_1$>60,000, so the corresponding search result data is stored by the server to the static html page in step 408. When K=2 it is determined that $S_2$=82,000 or $S_2$>60,000, so the corresponding search result data is stored by the server to the static html page in step 408. When K=3 it is determined that $S_3$=64,000 or $S_3$>60,000, so the corresponding search result data is stored by the server to the static html page in step 408. The site map generated and stored in step 414 will thus include data for the three search queries "computer printers", "all-in-one printers" and "HP printers" which all exceed the established popularity threshold of V=60,000.

Figure 6:
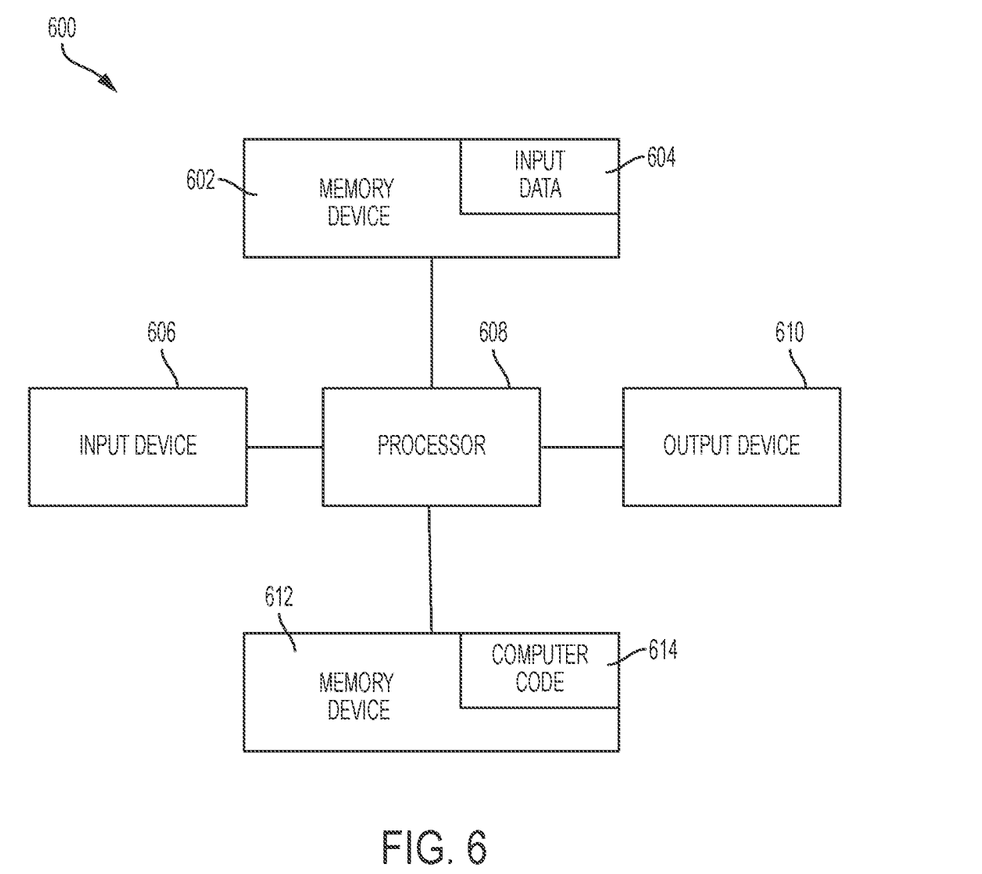
FIG. 6 is a block diagram of a computer system for implementing a search method in accordance with embodiments of the present invention.

FIG. 6 is a block diagram of a computer system, aka computing device, 600 for implementing search engine optimization based upon most popular search histories in accordance with embodiments of the present invention. The computing device 30 includes a processor 608, an input device 606 coupled to the processor 608, an output device 610 coupled to the processor 608, and memory devices 602 and 612 each coupled to the processor 608. The input device 606 may be, inter alia, a keyboard, a mouse, etc. The output device 610 may be, inter alia, a printer, a plotter, a computer screen, a magnetic tape, a removable hard disk, a floppy disk, etc. The memory devices 602 and 612 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 612 includes a computer code 614 which is a computer program that includes computer-executable instructions. The computer code 614 includes software or program instructions that may implement an algorithm for implementing methods of the present invention. The processor 608 executes the computer code 614. The memory device 602 includes input data 604. The input data 604 includes input required by the computer code 614. The output device 610 displays output from the computer code 614. Either or both memory devices 602 and 612 (or one or more additional memory devices not shown) may be used as a computer usable storage medium (or program storage device) having a computer readable program embodied therein and/or having other data stored therein, wherein the computer readable program includes the computer code 614. Generally, a computer program product (or, alternatively, an article of manufacture) of the computer system/device 600 may include the computer usable storage medium (or said program storage device). The processor 608 may represent one or more processors. The memory device 602 and/or the memory device 612 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, fieldprogrammable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A search method, comprising:
   receiving, by a server, from one or more users via computing devices, a search query to be searched at a first website;
   receiving, by the server, search result data from the first website in response to the search query, said search result data including a number of times the search query has been received by the first website in a predetermined time period;
   determining, by the server, whether the number of times the search query has been received by the first website in the predetermined time period exceeds a predetermined popularity threshold value;
   storing, by the server, the search query and the search result data onto a static html page in response to a determination that the number of times the search query has been received by the first website exceeds the predetermined popularity threshold value; and
   generating and storing, by the server, a site map corresponding to the first website, said site map including the static html page onto which the search query and the search result data are stored.

2. The search method of claim 1, said search method further comprising:
   submitting, by the server to public search engine crawlers, the site map, including the static html page onto which the search query and the search result data are stored, said site map to be searched by the public search engine crawlers.

3. The search method of claim 1, said search method further comprising:
   receiving, by the server, from the one or more users via computing devices, a modified search query to be searched at a first website, wherein said search query includes key words and said modified search query includes synonymous key words to the key words of the search query;
   receiving, by the server, updated search result data from the first website in response to the modified search query, said updated search result data including a number of times the modified search query has been received by the first website in the predetermined time period;
   determining, by the server, whether the number of times the modified search query has been received by the first website in the predetermined time period exceeds the predetermined popularity threshold value;
   storing, by the server, the modified search query and the updated search result data onto the static html page in response to the determination that the number of times the modified search query has been received by the first website exceeds the predetermined popularity threshold value; and
   generating and storing, by the server, the site map corresponding to the first website, said site map including the static html page onto which the modified search query and the updated search result data are stored.

4. The search method of claim 1, said search method further comprising:
   receiving by the server, from the one or more users via computing devices, a resubmitted said search query to be searched at the first website;
   receiving, by the server, updated search result data from the first website in response to the resubmitted search query, said updated search result data including a number of times the updated search query has been received by the first website in the predetermined time period;
   determining, by the server, whether the number of times the resubmitted search query has been received by the first website in the predetermined time period exceeds the predetermined popularity threshold value;
   storing, by the server, the resubmitted search query and the updated search result data onto the static html page in response to a determination that the number of times the resubmitted search query has been received by the first website exceeds the predetermined popularity threshold value; and
   generating and storing, by the server, the site map corresponding to the first website, said site map including the static html page onto which the resubmitted search query and the updated search result data are stored.

5. The search method of claim 1, said search method further comprising:
   receiving, by the server, from one or more users via computing devices, a plurality of search queries each having synonymous different key words to be searched at the first website;
   receiving, by the server, search result data from the first website in response to each of the plurality of search queries, each of the plurality of search result data comprising corresponding search result data to include a number of times each said search query has been received by the first website in the predetermined time period;
   determining, by the server, whether each of the plurality of search queries has been received by the first website in the predetermined time period to exceed the predetermined popularity threshold value;
   storing, by the server, each search query of the plurality of search queries and corresponding search result data onto the static html page in response to a determination that the number of times said each search query has been received by the first website exceeds the predetermined popularity threshold value; and
   generating and storing, by the server, the site map corresponding to the first website, said site map including the static html page onto which each search query of the plurality of search queries and the corresponding search result data are stored.

6. The search method of claim 5, wherein the plurality of search queries includes search queries having synonymous phrases.

7. The search method of claim 5, said search method further comprising:
   submitting, by the server to public search engine crawlers, the site map including the static html page onto which each search query of the plurality of search queries and the corresponding search result data are stored, said site map to be searched by the public search engine crawlers.

8. A computer program product, said computer program product comprising one or more computer readable hardware storage devices having computer readable program code stored therein, said program code containing instructions executable by a computing device to implement a search method, said search method comprising:
   receiving, by a server, from one or more users via computing devices, a search query to be searched at a first website;
   receiving, by the server, search result data from the first website in response to the search query, said search result data including a number of times the search query has been received by the first website in a predetermined time period;

determining, by the server, whether the number of times the search query has been received by the first website in the predetermined time period exceeds a predetermined popularity threshold value;

storing, by the server, the search query and the search result data onto a static html page in response to a determination that the number of times the search query has been received by the first website exceeds the predetermined popularity threshold value; and generating and storing, by the server, a site map corresponding to the first website, said site map including the static html page onto which the search query and the search result data are stored.

9. The computer program product of claim 8, said search method further comprising:

submitting, by the server to public search engine crawlers, the site map including the static html page onto which the search query and the search result data are stored, said site map to be searched by the public search engine crawlers.

10. The computer program product of claim 8, said search method further comprising:

receiving, by the server, from the one or more users via computing devices, a modified search query to be searched at a first website, wherein said search query includes key words and said modified search query includes synonymous key words to the key words of the search query;

receiving, by the server, updated search result data from the first website in response to the modified search query, said updated search result data including a number of times the modified search query has been received by the first website in the predetermined time period;

determining, by the server, whether the number of times the modified search query has been received by the first website in the predetermined time period exceeds the predetermined popularity threshold value;

storing, by the server, the modified search query and updated search result data onto the static html page in response to a determination that the number of times the modified search query has been received by the first website exceeds the predetermined popularity threshold value; and generating and storing, by the server, the site map corresponding to the first website, said site map including the static html page onto which the modified search query and the updated search result data are stored.

11. The computer program product of claim 8, said search method further comprising:

receiving by the server, from the one or more users via computing devices, a resubmitted said search query to be searched at the first website;

receiving, by the server, updated search result data from the first website in response to the resubmitted search query, said updated search result data including a number of times the updated search query has been received by the first website in the predetermined time period;

determining, by the server, whether the number of times the resubmitted search query has been received by the first website in the predetermined time period exceeds the predetermined popularity threshold value;

storing, by the server, the resubmitted search query and the updated search result data onto the static html page in response to a determination that the number of times the resubmitted search query has been received by the first website exceeds the predetermined popularity threshold value; and generating and storing, by the server, the site map corresponding to the first website, said site map including the static html page onto which the resubmitted search query and the updated search result data are stored.

12. The computer program product of claim 8, said search method further comprising:

receiving, by the server, from one or more users via computing devices, a plurality of search queries each having synonymous different key words to be searched at the first website;

receiving, by the server, search result data from the first website in response to each of the plurality of search queries, each of the plurality of search result data comprising corresponding search result data to include a number of times each said search query has been received by the first website in the predetermined time period;

determining, by the server, whether each of the plurality of search queries has been received by the first website in the predetermined time period to exceed the predetermined popularity threshold value;

storing, by the server, each search query of the plurality of search queries and corresponding search result data onto the static html page in response to a determination that the number of times said each search query has been received by the first website exceeds the predetermined popularity threshold value; and generating and storing, by the server, the site map corresponding to the first website, said site map including the static html page onto which each search query of the plurality of search queries and the corresponding search result data are stored.

13. The computer program product of claim 12, wherein the plurality of search queries includes search queries having synonymous phrases.

14. The computer program product of claim 12, said search method further comprising:

submitting, by the server to public search engine crawlers, the site map including the static html page onto which each search query of the plurality of search queries and the corresponding search result data are stored, said site map to be searched by the public search engine crawlers.

15. A system, comprising a computing device, said computing device comprising one or more processors, one or more memories, and one or more computer readable hardware storage devices, said one or more hardware storage devices containing program code executable by the one or more processors via the one or more memories to implement a search method, said search method comprising:

receiving, by a server, from one or more users via computing devices, a search query to be searched at a first website;

receiving, by the server, search result data from the first website in response to the search query, said search result data including a number of times the search query has been received by the first website in a predetermined time period;

determining, by the server, whether the number of times the search query has been received by the first website in the predetermined time period exceeds a predetermined popularity threshold value;

storing, by the server, the search query and the search result data onto a static html page in response to a determination that the number of times the search query has been received by the first website exceeds the predetermined popularity threshold value; and generating and storing, by the server, a site map corresponding to the first website, said site map including the static html page onto which the search query and the search result data are stored.

16. The system of claim 15 further comprising the search method being implemented on the system by:

submitting, by the server to public search engine crawlers, the site map including the static html page onto which the search query and the search result data are stored, said site map to be searched by the public search engine crawlers.

17. The system of claim 15 further comprising the search method being implemented on the system by:

receiving, by the server, from the one or more users via computing devices, a modified search query to be searched at a first website, wherein said search query includes key words and said modified search query includes synonymous key words to the key words of the search query;

receiving, by the server, updated search result data from the first website in response to the modified search query, said updated search result data including a number of times the modified search query has been received by the first website in the predetermined time period;

determining, by the server, whether the number of times the modified search query has been received by the first website in the predetermined time period exceeds the predetermined popularity threshold value;

storing, by the server, the modified search query and updated search result data onto the static html page in response to a determination that the number of times the modified search query has been received by the first website exceeds the predetermined popularity threshold value; and generating and storing, by the server, the site map corresponding to the first website, said site map including the static html page onto which the modified search query and the updated search result data are stored.

18. The system of claim 15 further comprising the search method being implemented on the system by:

receiving by the server, from the one or more users via computing devices, a resubmitted said search query to be searched at the first website;

receiving, by the server, updated search result data from the first website in response to the resubmitted search query, said updated search result data including a number of times the updated search query has been received by the first website in the predetermined time period;

determining, by the server, whether the number of times the resubmitted search query has been received by the first website in the predetermined time period exceeds the predetermined popularity threshold value;

storing, by the server, the resubmitted search query and the updated search result data onto the static html page in response to a determination that the number of times the resubmitted search query has been received by the first website exceeds the predetermined popularity threshold value; and generating and storing, by the server, the site map corresponding to the first website, said site map including the static html page onto which the resubmitted search query and the updated search result data are stored.

19. The system of claim 15 further comprising the search method being implemented on the system by:

receiving, by the server, from one or more users via computing devices, a plurality of search queries each having synonymous different key words to be searched at the first website;

receiving, by the server, search result data from the first website in response to each of the plurality of search queries, each of the plurality of search result data comprising corresponding search result data to include a number of times each said search query has been received by the first website in the predetermined time period;

determining, by the server, whether each of the plurality of search queries has been received by the first website in the predetermined time period to exceed the predetermined popularity threshold value;

storing, by the server, each search query of the plurality of search queries and corresponding search result data onto the static html page in response to a determination that the number of times said each search query has been received by the first website exceeds the predetermined popularity threshold value; and generating and storing, by the server, the site map corresponding to the first website, said site map including the static html page onto which each search query of the plurality of search queries and the corresponding search result data are stored.

20. The system of claim 19 wherein the plurality of search queries includes search queries having synonymous phrases.

* * * * *